United States Patent
Almaraz, II et al.

(10) Patent No.: US 10,258,199 B2
(45) Date of Patent: Apr. 16, 2019

(54) DRINK MIXING DEVICE

(71) Applicant: Victor Anthony Almaraz, II, San Antonio, TX (US)

(72) Inventors: Victor Anthony Almaraz, II, San Antonio, TX (US); Alex Villareal, San Antonio, TX (US)

(73) Assignee: Anthony Victor Almaraz, II, San Antonio, TX (US)

( * ) Notice: Subject to any disclaimer, the term of this patent is extended or adjusted under 35 U.S.C. 154(b) by 0 days.

(21) Appl. No.: 15/635,339

(22) Filed: Jun. 28, 2017

(65) Prior Publication Data
US 2018/0000289 A1 Jan. 4, 2018

Related U.S. Application Data

(60) Provisional application No. 62/356,025, filed on Jun. 29, 2016.

(51) Int. Cl.
*A47J 43/042* (2006.01)
*H02J 7/02* (2016.01)
(Continued)

(52) U.S. Cl.
CPC .............. *A47J 43/042* (2013.01); *B01F 3/08* (2013.01); *B01F 7/0095* (2013.01);
(Continued)

(58) Field of Classification Search
CPC .................. B01F 13/002; B01F 13/005; B01F 2215/0072; B01F 7/00733; B01F 15/00519; A47J 43/042; H02J 50/10; H02J 7/025; H02J 7/042; H02J 7/044
See application file for complete search history.

(56) References Cited

U.S. PATENT DOCUMENTS 4,575,255 A 3/1986 Kafka
5,697,230 A * 12/1997 Ender ................. A47L 15/4445
68/3 SS
(Continued)

FOREIGN PATENT DOCUMENTS

DE 202004006069 U1 9/2004
DE 102006037278 A1 2/2008
(Continued)

OTHER PUBLICATIONS https://www.bodybuilding.com/store/cellucor/vortex-portable-mixer.html?skuId=CELLU4510118&PLASKU=CELLU4510118&mcid=CG_PLA_US_GS_Cellucor&bbdevice=c&bbskuid=CELLU42402478gclid=EAlalQobChMI6rff7OzO1AlVDHt-Ch12NQL9EAYYASABEgLFi_D_BwE; 2017; US.
(Continued)

*Primary Examiner* — Tony G Soohoo
*Assistant Examiner* — Elizabeth Insler
(74) *Attorney, Agent, or Firm* — Nick Guinn; Gunn, Lee & Cave, P.C.

(57) ABSTRACT

The present invention is a drink mixing device generally characterized as having a ball assembly in wireless communication with a base assembly. The base assembly comprises a casing for storing a first battery, a transmitter that receives power from the first battery, a base assembly wireless coil, a power port receiving for external power and host or peripheral connection, a button located along the casing wherein the button is electronically connected to the transmitter. The ball assembly comprises a casing for storing a second battery, a motor, a ball assembly wireless coil, and a receiver. The motor turns a propeller external to but affixed to the exterior of the ball assembly when the motor is powered and turned on. The propeller is protected by a metal spiral.

6 Claims, 8 Drawing Sheets

(51) Int. Cl.
*B01F 3/08* (2006.01)
*H02J 50/10* (2016.01)
*B01F 7/00* (2006.01)
*H02P 1/18* (2006.01)
*B01F 13/00* (2006.01)
*B01F 15/00* (2006.01)

(52) U.S. Cl.
CPC ...... *B01F 7/00341* (2013.01); *B01F 7/00733* (2013.01); *B01F 13/005* (2013.01); *B01F 15/00512* (2013.01); *B01F 15/00519* (2013.01); *H02J 7/025* (2013.01); *H02J 50/10* (2016.02); *H02P 1/18* (2013.01); *B01F 2215/0022* (2013.01)

(56) References Cited

U.S. PATENT DOCUMENTS

2007/0165485 A1  7/2007  Cai
2014/0158680 A1* 6/2014  Kitaizumi ............. H05B 6/062
                                                    219/665
2016/0129407 A1* 5/2016  Wrosch ............. B01F 11/0266
                                                    366/108
2018/0185797 A1* 7/2018  Frei .................... B01F 7/00733

FOREIGN PATENT DOCUMENTS

| | | |
|---|---|---|
| DE | 102014008371 A1 | 12/2015 |
| EP | 1561409 A1 | 8/2005 |
| GB | 2288989 A | 11/1995 |
| GB | 2358814 A | 8/2001 |
| WO | 2013036186 A1 | 3/2013 |

OTHER PUBLICATIONS https://www.blenderbottle.com/products/classic; 2002; US.
https://web.archive.org/web/20020327095632/http:///www.blenderbottle.com/; May 5, 2016; US.

* cited by examiner

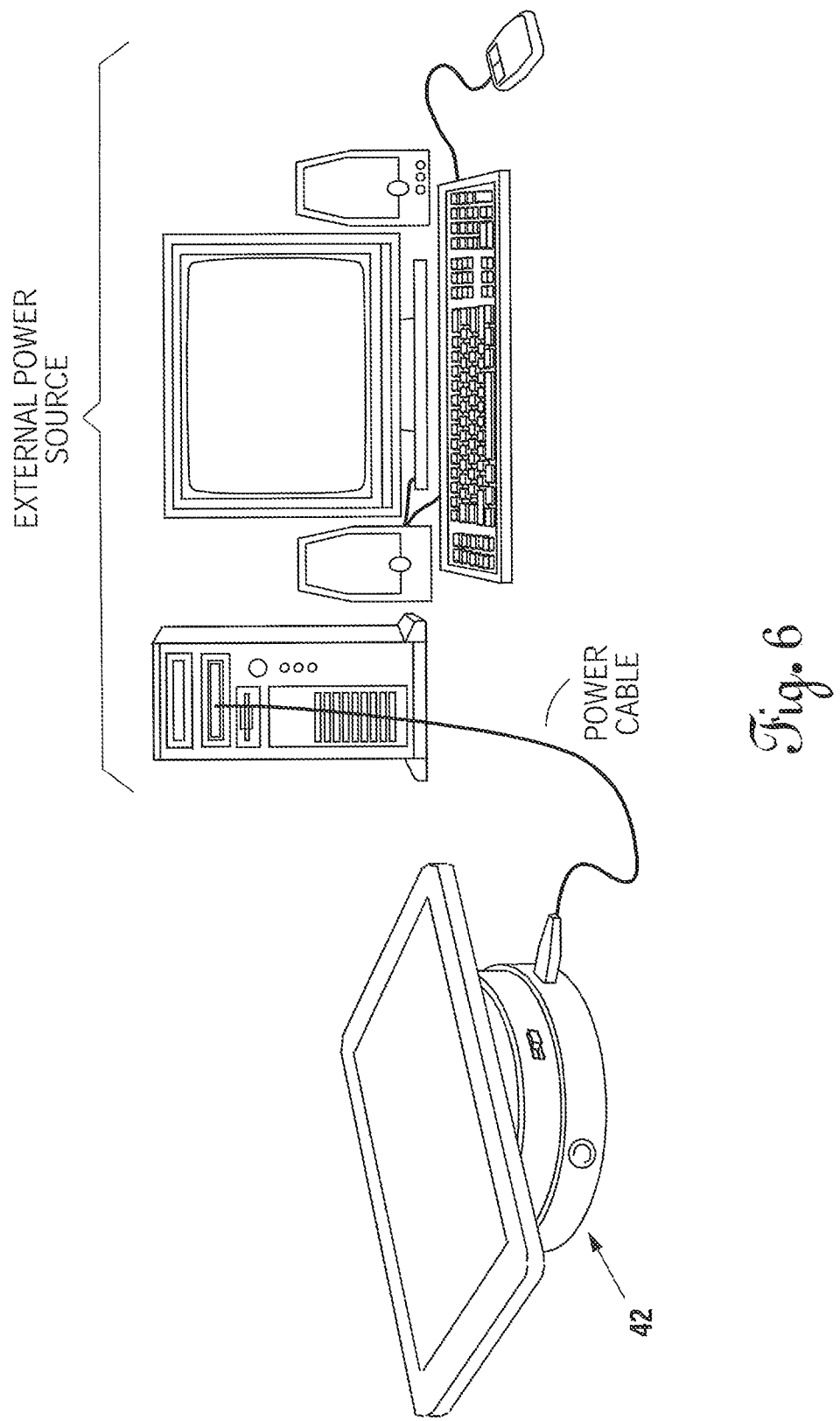

US 10,258,199 B2

DRINK MIXING DEVICE

CROSS REFERENCES TO RELATED APPLICATION

This application claims the benefit of U.S. Provisional Application No. 62/356,025, filed Jun. 29, 2016, which is incorporated by reference herein.

FEDERALLY SPONSORED RESEARCH OR DEVELOPMENT

Not applicable.

BACKGROUND OF THE INVENTION

1. Field of the Invention

The present invention relates generally to mixing potable liquids.

2. Description of the Related Art

Familiar mixing devices exhibit problems relating to one or more of the following: size, mobility, durability, awkwardness, effectiveness, etc. The present invention reduces these problems.

BRIEF SUMMARY OF THE INVENTION

The present invention is a drink mixing device generally characterized as having a ball assembly in wireless communication with a base assembly. The base assembly comprises a casing for storing a first battery, a transmitter that receives power from the first battery, a base assembly wireless coil, a power port receiving for external power and host or peripheral connection, a button located along the casing wherein the button is electronically connected to the transmitter. The ball assembly comprises a casing for storing a second battery, a motor, a ball assembly wireless coil, and a receiver. The motor turns a propeller external to but affixed to the exterior of the ball assembly when the motor is powered and turned on. The propeller is protected by a metal spiral.

BRIEF DESCRIPTION OF THE SEVERAL VIEWS OF THE DRAWINGS

FIG. 6 is a perspective view of an embodiment of the present invention receiving power from an external power source.

DETAILED DESCRIPTION OF THE INVENTION

Figure 1:
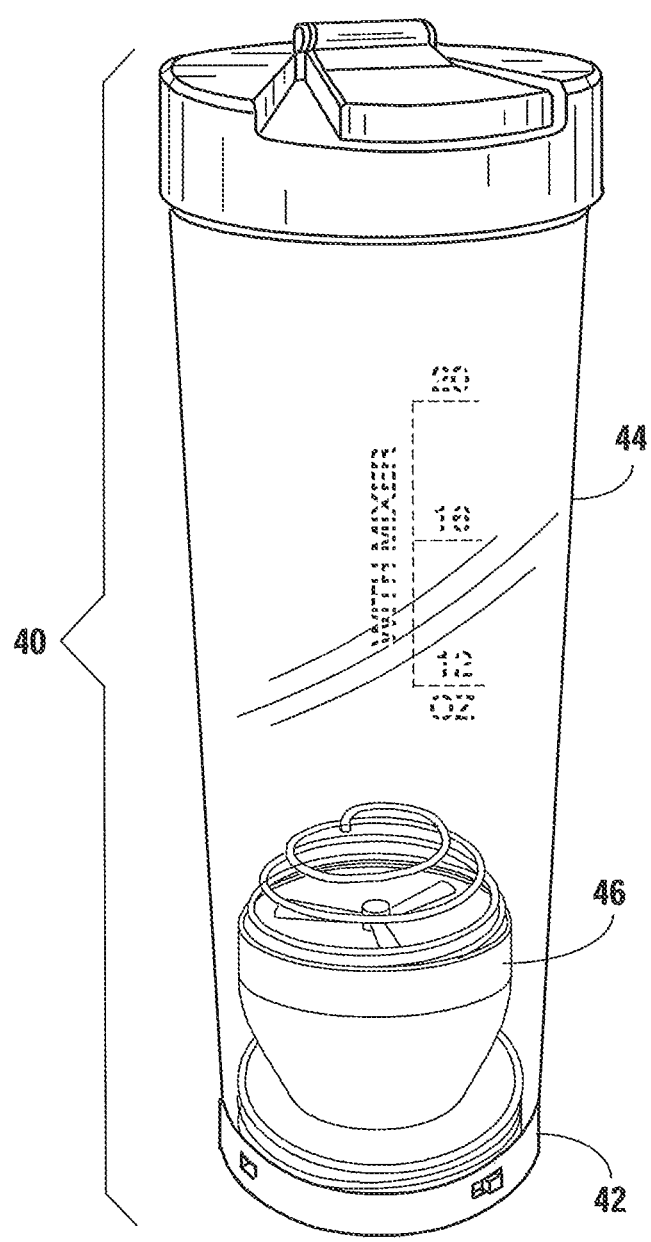
FIG. 1 is a perspective view of a first embodiment of the present invention.

FIG. 1 illustrates an embodiment 40 of the present invention, which comprises a base assembly 42, a bottle 44, and a ball assembly 46. In this particular embodiment, the ball assembly 46 is used to mix potable fluids in the bottle 44.

Figure 2:
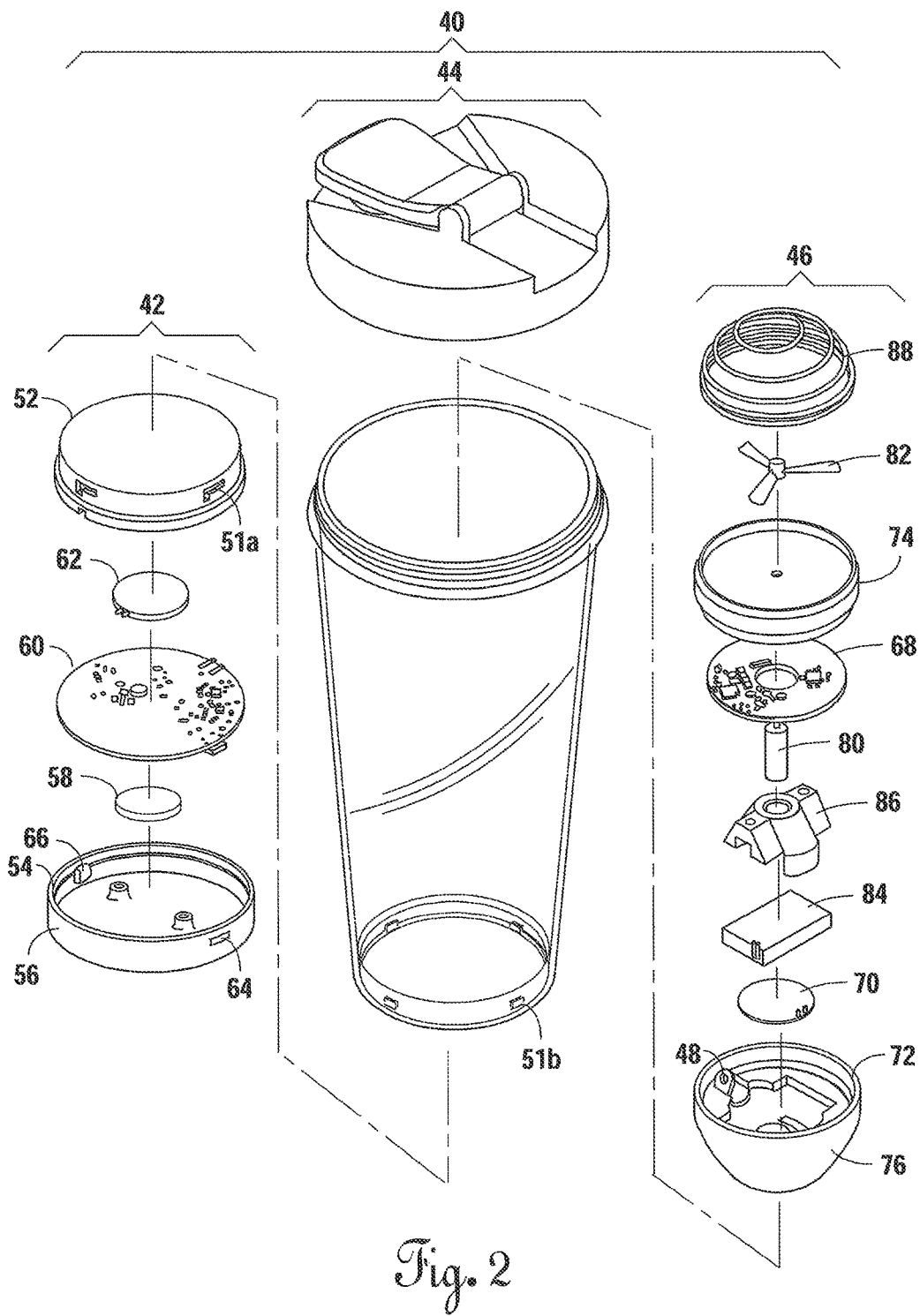
FIG. 2 is an exploded view thereof.

FIG. 2 illustrates an exploded view of the embodiment 40. The ball assembly 46 may be engaged by directly pushing a button 48 located on the ball assembly 46 and lowering the ball assembly 46 into the bottle 44. In this embodiment, the ball assembly 46 is programmable with a time delay when engaged in this manner. Alternatively, the ball assembly 46 is engaged when a button 66 located on the base assembly 42. When engaged in this manner, the ball assembly 46 is usually already located in the bottle 44.

As suggested, the ball assembly 46 is movable within the bottle 44 and is removable from the bottle 44. In fact, it is anticipated that the ball assembly 46 can be used to mix fluids and other substances in other containers, including but not limited to punch bowls, pots, cauldrons, or even another bottle.

The base assembly 42 is attachable to the external bottom of the bottle 44 and is removable, as well. The ability to attach the base assembly 42 to the bottle 44 is useful for keeping all components of the embodiment 40 together (e.g., organization) and it also allows for efficient charging (e.g., energy transfer) between the base assembly 42 and the ball assembly 46. The process of charging (e.g., energy transfer) is discussed in greater detail below.

The benefit of removing or otherwise detaching the base assembly 42 from the bottle 44 are equally apparent. First, removal of the base assembly 42 allows for easier cleaning of the bottle 44 in between uses. Second, removal of the base assembly 42 allows for wireless use of the bottle 44 and ball assembly 46 for mixing fluids and other substances.

Although other means are available (e.g., adhesives, Velcro, other mechanical engagements), the base assembly 42 is attachable/detachable from the bottle 44 via locking threads 51*a* on the base assembly 42 and locking threads 51*b* on the exterior bottom face of the bottle 44.

The locking threads 51*a* of this embodiment are located on the casing top 52 of the base assembly 42. The exterior components of the base assembly 42 include the casing top 52, the casing bottom 54, and an over mold 56. More specifically, the casing top 52 and the casing bottom 54 are mechanically connected and are made of plastic in this embodiment. The casing top 52 and the casing bottom 54 provide for an opening or interstitial space when connected. This opening allows for storage and placement of additional base assembly 42 components, discussed below. Several of the base assembly 42 components are electronica or delicate, and therefore the over mold 56, which is made of rubber, is used to provide additional durability and shielding from elements. It is not unlikely that a drinking bottle (whether the bottle 44 or a nearby bottle) might sweat or otherwise allow fluid to escape. In that event, fluid might rest on a table or surface. The over mold 56 is intended to reduce exposure by the components of the base assembly 42 to such fluids. In this embodiment, the casing bottom 54 is rigid and the over mold 56 is a flexible rubber that stretches over the casing bottom 54 and remains in place along the exterior of the casing bottom 54. The bottom of the bottle 44 is elevated above the exterior wall of the bottle such that the bottle may receive the base assembly 42, and in particular, the casing top 52 and the locking threads 51a when the base assembly 42 is attached to the bottle 44. To that end, the over mold 56 provides a flush surface between the bottle 44 and the base assembly 42 when attached.

As mentioned above, the base assembly 42 comprises several interior components, including a battery 58, a printed circuit board (PCB) with transmitter 60, a base assembly wireless coil 62, a power port 64, and a button 66.

In this particular embodiment, the battery 58 is used to power the transmitter 60. The battery may be of a variety of types known in the art, such as a 3 volt or CR2032 battery. The transmitter 60 communicates with a receiver circuit board 68 located on a second PCB in the ball assembly 46.

The button 66 is a rubberized indentation in the over mold 56, which communicates with the transmitter 60. In particular, a user presses the button 66, either when the base assembly 42 is connected to the bottle 44 or detached and located across a room. Because the button 66 provides a signal to the transmitter 60 and the transmitter 60 is in communication with the receiver circuit board 68, the ball assembly 46 starts or stops. In certain embodiments, the button 66 and transmitter 60 may have several settings (e.g., distinguished through a "first click," "second click," "third click," etc.) for manipulating the speed or cadence of the ball assembly 46. In further alternative embodiments, the button 66 might be replaced with a dial or other means (e.g., a switch) for engaging/disengaging or adjusting the ball assembly. If a dial or similar means is used instead of a button, manipulation would presumably become more continuous and less discrete.

The wireless coil 62 receives power from and is connected to the power port 64. When a power cable, such as a Micro-USB connector, receives power from an external power source (e.g., Computer) (not shown) and is connected to the power port 64, the base assembly 42 receives energy/power. In the present embodiment, the power received by the base assembly is transferred from the external source through the power cable, and through the power port 64 to the wireless coil 62. The wireless coil 62 then transfers energy via induction to a ball assembly wireless coil 70 located in the ball assembly 46, as described in greater detail below.

Figure 3:
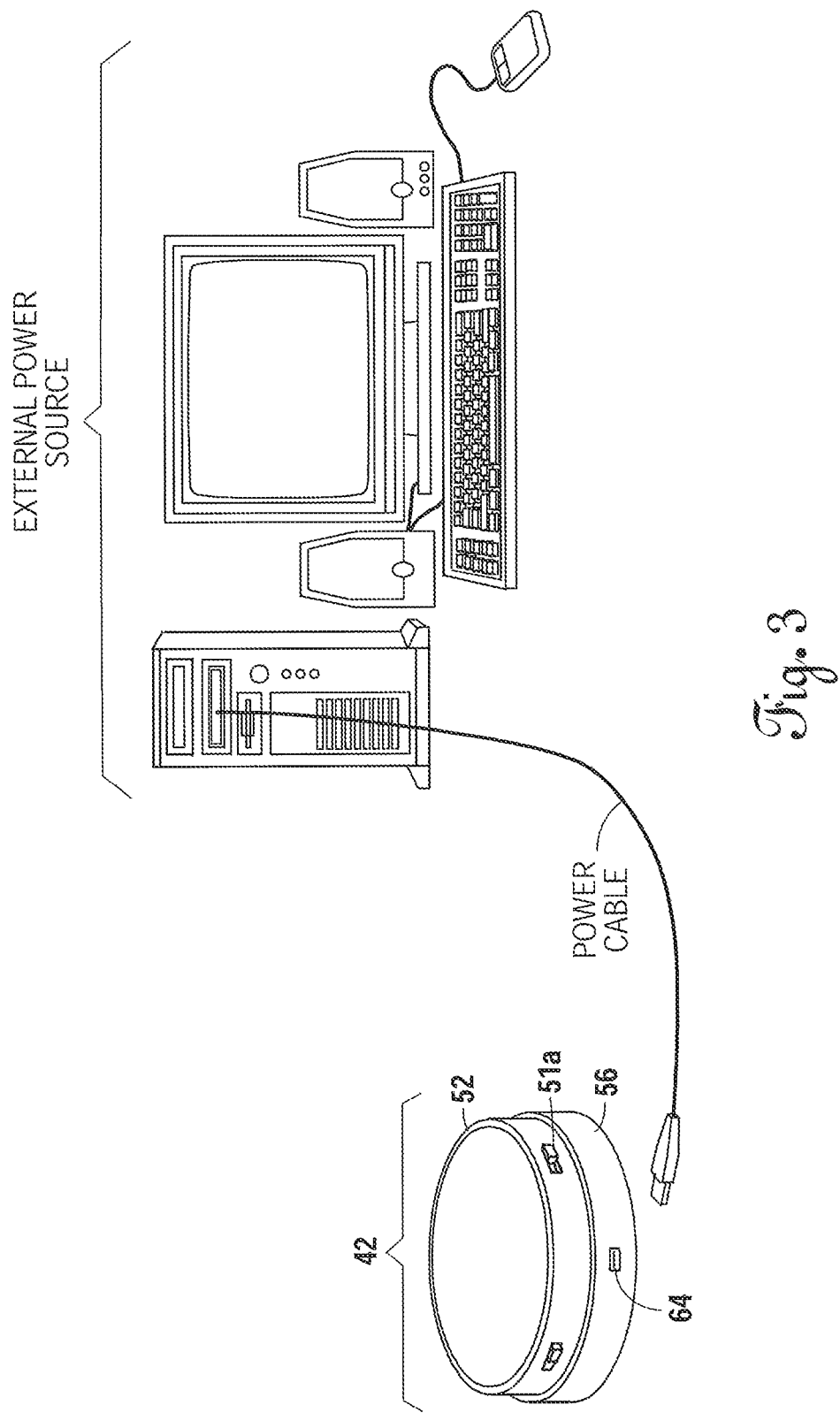
FIG. 3 is a perspective view of an embodiment of the present invention in proximity to an external power source.
Figure 4:
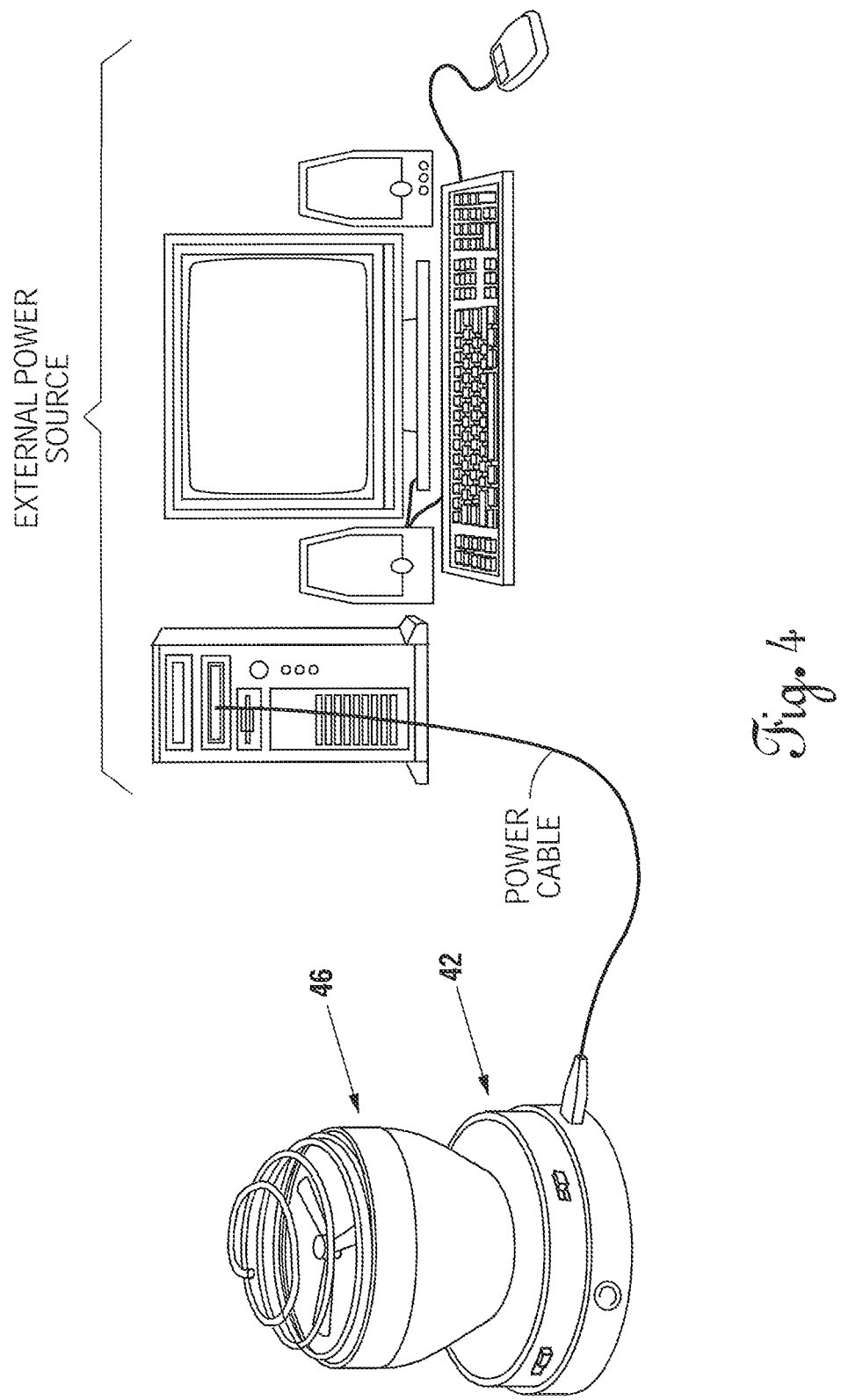
FIG. 4 is a perspective view of an embodiment of the present invention receiving power from an external power source.

FIG. 3 illustrates the base assembly 42 and a power port 64 in proximity to a power cable, with the power cable connected to an external power source. FIG. 4 illustrates the base assembly 42 connected to the external power source—via the power cable—and the ball assembly 46 is positioned above the base assembly 42.

In this particular embodiment, the induction described above may occur when the ball assembly 46 is positioned directly on top of the base assembly 42 (and the ball assembly 46 is not mixing fluids) as illustrated in FIG. 4. The induction may also occur when the ball assembly 46 is located in the bottle 44 (or other container) and the base assembly 42 is located underneath the bottle 44 (or other container); or the ball assembly 46 is otherwise in close proximity to the base assembly 42 as required for electrical induction.

Figure 5:
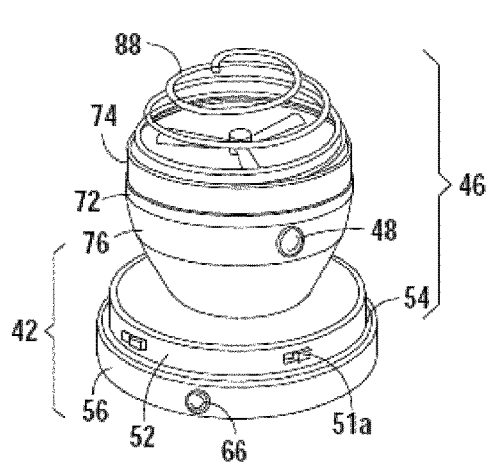
FIG. 5 is a perspective view of an embodiment of the present invention.

In some embodiments, the base assembly 42 also stores power in a battery contained within the base assembly. In those embodiments, the base assembly 42 could transfer power to the ball assembly 46 without direct connection to an external power source. Such an embodiment is illustrated in FIG. 5.

Like the base assembly 42, the ball assembly 46 comprises an outer shell and mold, which contain several electrical and mechanical components. That shell and mold may be characterized as a ball base 72, a ball top 74, and an over mold 76. The over mold 76 functions much like the over mold 56 composing part of the base assembly 42.

The button 48 is a rubberized indentation in the over mold 76, which communicates with the receiver circuit board 68 and the circuit board communicates with a motor 80. In particular, a user presses the button 48 and the ball assembly 46 starts or stops. Namely, a propeller 82 connected to the motor 80 begins to rotate or stops.

In certain embodiments, the button 48 coupled with the receiver circuit board 68 may have several settings (e.g., distinguished through a "first click," "second click," "third click," etc.) for manipulating the speed or cadence of the propeller 82. In further alternative embodiments, the button 48 might be replaced with a dial or other means (e.g., a switch) for engaging/disengaging or adjusting the propeller. If a dial or similar means is used instead of a button, manipulation would presumably become more continuous and less discrete.

Operation of the motor 80, and accordingly the propeller 82, requires sufficient power in the ball assembly 46. As described above, the wireless coil 70 receives energy from the base assembly 42 via induction. Induction can be improved if the wireless coil 70 is around the lower regions of the ball assembly 46, and the ball base 72.

As the wireless coil 70 receives energy via induction, energy is subsequently transferred from the wireless coil 70 to an energy circuit board (not illustrated) located on the receiver circuit board 68, and then a charging circuit (not illustrated) located on the receiver circuit board 68. From the charging circuit, energy is transferred to a rechargeable battery 84. Although not limiting, the present embodiment uses a 250 mAH rechargeable battery 84 to power an 8 mm×20 mm motor 80.

In this embodiment, the battery is secured in place with a battery holder 86 fixed in position within the ball assembly 46.

In this embodiment, a ball spiral 88 is secured to ball top 74 such that a user may shake the bottle 44 and accordingly the ball assembly 46 without compromising the propeller 82 and such that the bottle may be shaken while the ball assembly is powered on. The ball spiral 88 of this embodiment is designed in such a way that the curvature is somewhat similar to that of protein ball shakers known in the art. However, this ball spiral is closer to a hemi-sphere than a complete sphere (as seen in the art).

Figure 7:
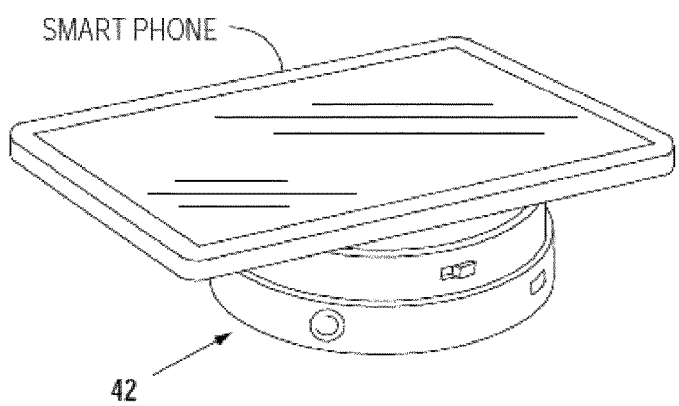
FIG. 7 is a perspective view of an embodiment of the present invention.

The base assembly 42 is also capable of charging a smart phone or other, similar wireless devices by electric induction. This process is illustrated by FIG. 6. And as mentioned above, in certain embodiments, the base assembly 42 comprises a rechargeable battery that allows the base assembly 42 to charge the ball assembly or a smart phone without a direct connection to an external power source. FIG. 7 illustrates such an embodiment.

In certain embodiments, the rotation of the fans/blades will create a vortex or other phenomenon associated with turbulent flow, which may or may not be visually appealing to the user.

In certain embodiments, the ball spiral may rotate about a central access of the ball assembly. In other embodiments it may rotate or move or translate across other accesses or directions. Although the ball spiral is illustrated as a spiral in this particular embodiment, the cage may appear to resemble a nest, a web, a spiral, a honeycomb or any other number of shapes and patterns, but would allow for liquid to enter the cage and access the fan/blades. In other embodiments, a cage may not exist and the fans or blades may be exposed directly to the liquid. In other embodiments, there may not be fans or blades, but the cage itself may move or create agitation and mix the fluids. Although the present invention is generally illustrated and characterized as a sphere like structure, the invention may appear or exist in other shapes including cube, oblate spheroid, prism, frustum, etc.

Figure 8:
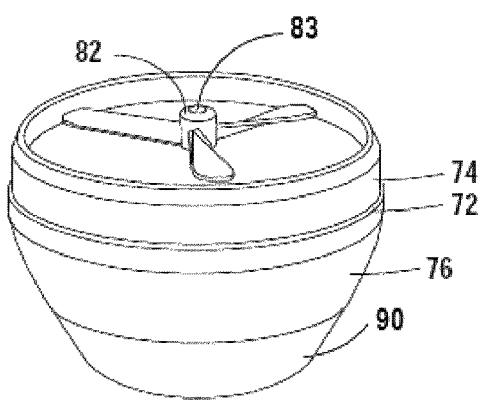
FIG. 8 is a perspective view of an embodiment of the present invention.

FIG. 8 illustrates a different aspect of the present embodiment of this invention, including a light 83, which in some embodiments might be one or more LED lights, at the center of the fan/blades such that the vortex when induced may be illuminated.

In some embodiments, the ball assembly will comprise a magnet or a weighted sinker to maintain a consistent orientation and direction of the device if intended to remain fixed when in the bottle. Of course, the magnet and weighted sinker should not be construed as limiting. Certain embodiments will not include a magnet or a sinker. FIG. 8, for example, illustrates a weighted sinker 90 that is incorporated into the external body of the ball assembly. In this particular embodiment, the lower portion of the ball assembly's external body is heavier than the upper portion of the ball assembly.

Additionally, FIG. 8 illustrates the device without a ball spiral. In some embodiments where the ball assembly does not comprise a ball spiral, the ball spiral might be replaced with a wire mesh or alternative shapes such as weaves, chains, honey comb. Alternatively, the ball spiral or other cage like barrier might not be rounded. Instead it might be rectangular or triangular, etc.

Figure 9:
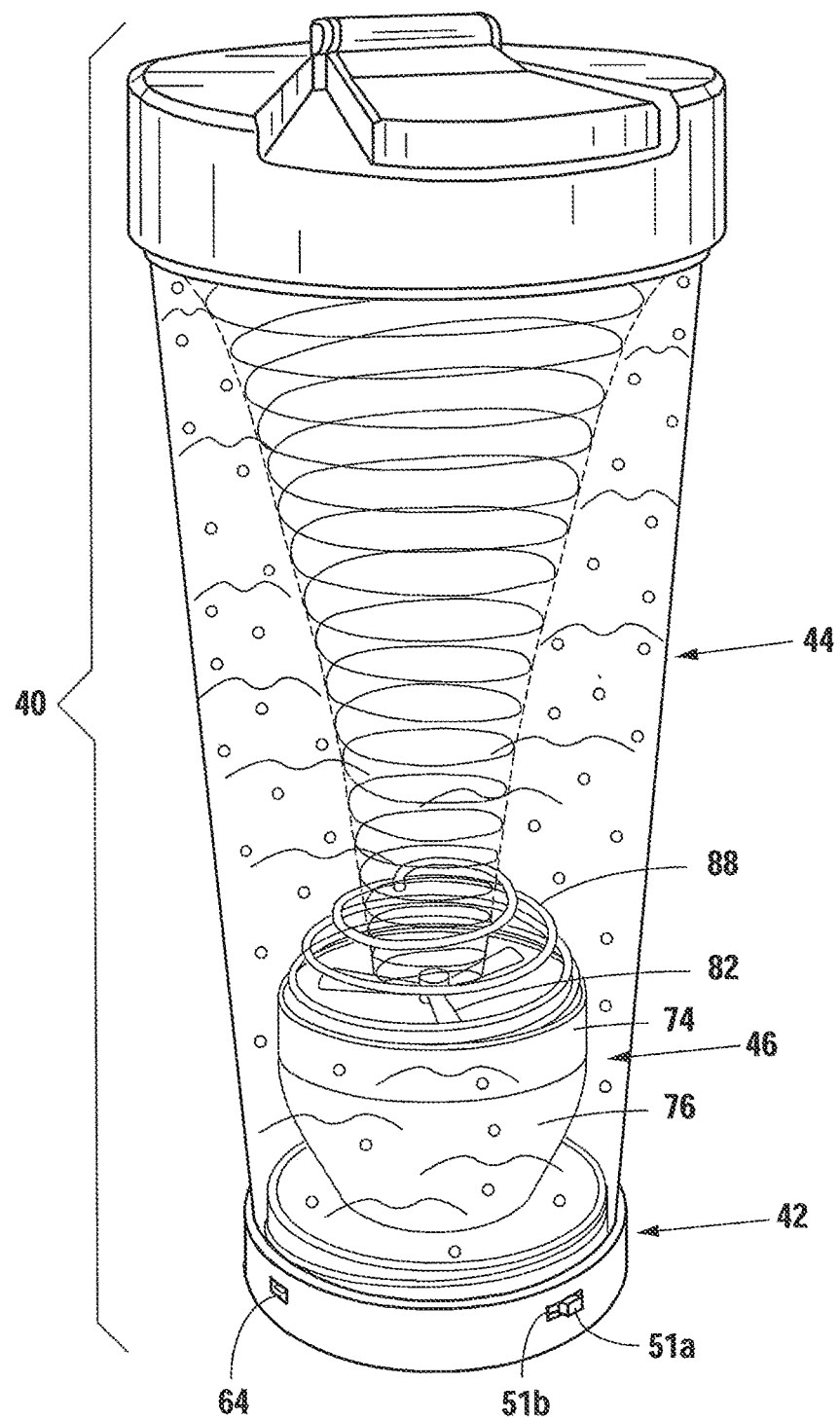
FIG. 9 is a perspective view of an embodiment of the present invention in use and creating a vortex.

FIG. 9 is a illustrates an embodiment of the present invention wherein the device has been turned on and the device has fluid (e.g., water therein). By turning on the device with water therein, a vortex results in this particular embodiment.

Figure 10:
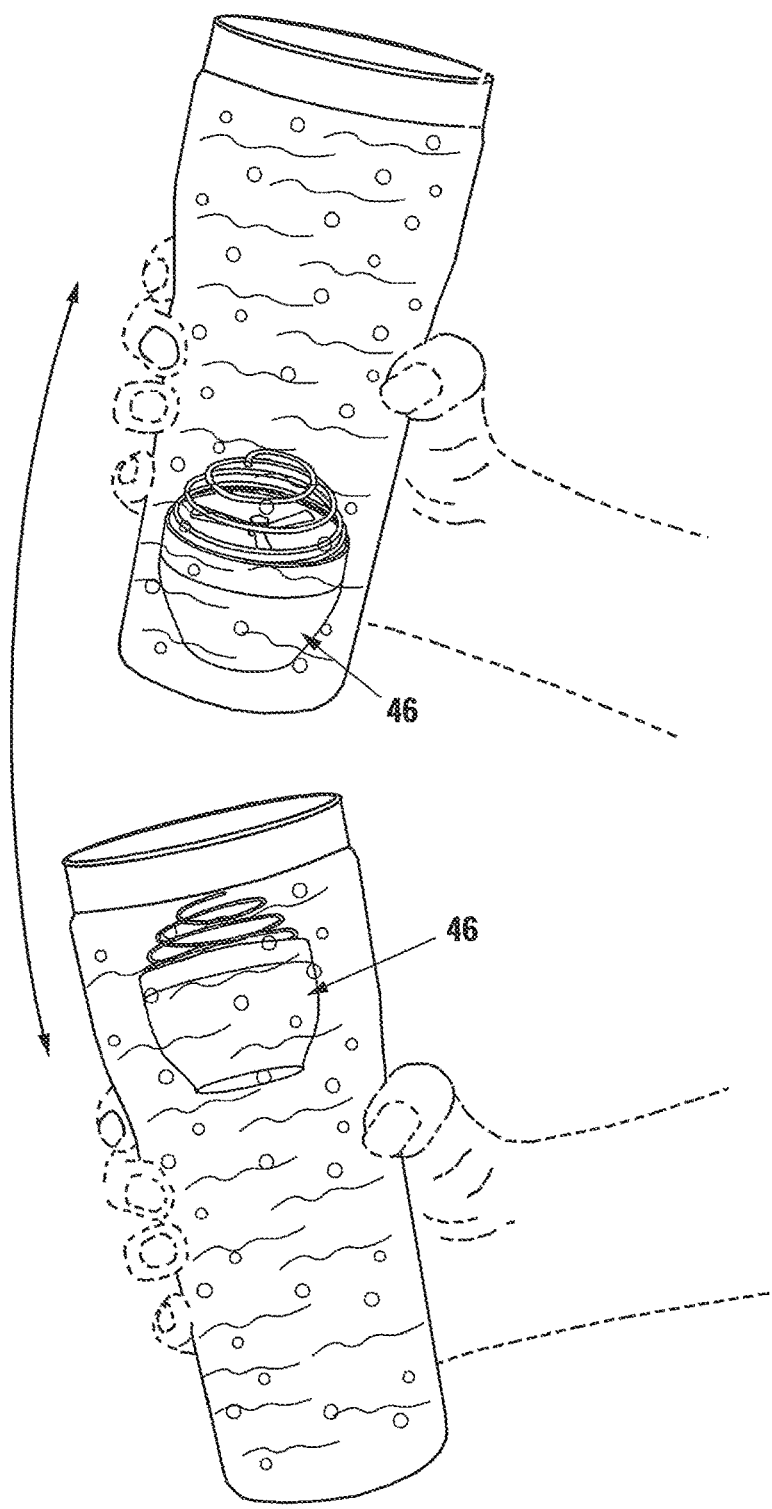
FIG. 10 is a perspective view of an embodiment of the ball assembly showing a user manually agitating a bottle containing the ball assembly and the fluid contents of the bottle.

FIG. 10 illustrates a user holding a drinking bottle containing an embodiment of the ball assembly and shaking the bottle up and down. By shaking the bottle, the user manually agitates the ball assembly and the contents therein.

In certain embodiments a USB Micro B input connector supplies 5V power to a lithium polymer (LiPo) battery charger. The LiPo battery charger controls charging of the LiPo battery in the base assembly. The LiPo battery supplies the main power for the base assembly to transmit a battery charge to the ball unit, or any other compatible device. The LiPo battery supplies power to a signal transmitter (RF TX) and microcontroller (MCU) processor (UUID Serial Code) circuits. Power is supplied to a wireless charger transmitter through a boost circuit, booster, to increase the 3.7V battery voltage to 5.0V. The wireless charger transmitter transmits power to a wireless charger receiver and receives communication from the wireless charger receiver in order to adjust output power, as needed by the wireless charger receiver. Power is supplied to a signal transmitter through a low-dropout voltage regulator that limits the voltage to the transmitter to 3.3V. When the push button single pole single thrown (SPST) switch is pressed the MCU powers the RF TX (transmitter) and modulates the transmitter with a unique code so that only one receiver will respond to the signal from the transmitter. After the signal is sent the MCU removes power from the transmitter and places itself, the MCU, in a low power state until the push button switch is pressed again.

In those embodiments, the wireless charger receiver receives power from the wireless charger transmitter and provides signal feedback to the wireless charger transmitter for power control. The wireless charger receiver includes a battery charger circuit for charging a LiPo Battery in the ball assembly. The LiPo Battery supplies power to an RF RX (receiver), an MCU processor circuit, and a transistor switch (Motor Driver) that spins a mixing propeller. Power to the receiver is limited to 3.3 volts by a low-dropout voltage regulator. The motor driver is activated for 25 seconds (or some other period of time) when one of two things happens in the ball assembly: either a signal is received by the receiver that contains a matching UUID serial code or the push button SPST switch on the ball assembly is pressed. Another function of the push button switch is to pair the ball assembly the base assembly. This is achieved by pressing and holding the push button switch on the ball assembly while also pressing the push button switch on the base assembly, at the same time. The pairing can be confirmed in several ways, including the motor drive spinning the motor for one second or another fixed unit of time.

Also, and in other embodiments the fans/blades may exist in various numbers in the particular environment the fans/blades appear to be in a group of ten. In other embodiments, there may be one blade or more. In some embodiments, the fans may be oriented in different directions.

By using a delayed timer, a user may engage the timer; place the device in the desired fluid and after the desired period of time has elapsed, the device begins to mix the fluid.

As indicated above, the first section of the ball assembly 42 in certain embodiments may be turned on or off or otherwise adjusted using remote devices such as a smart phone—using Bluetooth or other related technology. In addition to turning the device on or off, and lighting features may be adjusted on or off or change of color, etc. The remote features also allow for the fans to change direction or speed.

In other alternative embodiments, the ball assembly 46 may be constructed in three or more sections while maintaining the spirit of the invention disclosed herein. To that end, in certain embodiments, a multi-purpose scooper could be added to the first section opposite the second section. Additionally, the ball assembly in certain embodiments may not be in the shape of a ball. Rather, the ball assembly may be in the shape of an obloid, an oblate spheroid, a prism, a frustum, among other shapes.

Other alternative embodiments may allow for wireless communication via mobile application In some embodiments, the invention may comprise a storage compartment for items such as capsules, powders, batteries, etc.

In certain embodiments, this invention is made of thorough material which may include metal, plastic, fiberglass, or a number of other materials. Metal can come from machined aluminum welding or casting, or similar steel or alloy. Molded or machined plastic can be used with recommended strengthening and features like ribs and other sectioning techniques. In a preferred embodiment, the materials would be very light weight. The particular thickness or the dimensions of the materials are not critical so long as the pieces are necessarily durable to allow sufficient mixing and induction of a vortex when desired. In most embodiments, the invention will include various nuts, bolts, screws, etc. for securing the pieces together. The length and width of the rods and pieces may be a varying dimension.

It will be appreciated by persons in the art and numerous variations and/or modifications may be made to the invention as shown in the specific embodiments without departing from the spirit or scope of the invention as broadly described. The present embodiments are therefore, to be considered in all respects illustrative and not restrictive. Other features and aspects of this invention will be appreciated by those skilled in the art upon reading and comprehending the disclosure. Such features, aspects, and variations and modifications of the reported results are examples clearly within the scope of the invention where the invention is limited solely by the scope of the following claims.

Some embodiments will not comprise a bottle; or a transmitter.

The invention claimed is:

1. A drink mixing device comprising:
    A first assembly comprising:
        a casing bottom;
        a casing top mechanically connected to the casing bottom;
        a first battery;
        a transmitter electrically connected to the first battery;
        a first assembly wireless coil;
        a power port for external power source and host or peripheral connection;
        a first button located on the casing bottom and electrically connected to the transmitter;
    a second assembly in wireless communication with the first assembly having:
        a first shell;
        a second shell mechanically connected to the first shell;
        a second assembly wireless coil;
        a receiver electrically connected to the second assembly wireless coil
        a second battery electrically connected to the receiver;
        a motor electrically connected to the second battery;
        a propeller mechanically connected to the motor; and
            a spiral mechanically connected to the second shell, the spiral at least partially surrounding the propeller.

2. The drink mixing device of claim 1 wherein the second assembly further comprises a weighted sinker connected to the first shell.

3. The drink mixing device of claim 1 further comprising a light source is mechanically connected to the second shell and electrically connected to the second battery.

4. The drink mixing device of claim 3 wherein the light source is a light emitting diode.

5. The drink mixing device of claim 1 wherein the spiral is a semi-spherical helix.

6. A drink mixing device comprising:
    A first assembly having:
        a casing bottom;
        a casing top mechanically connected to the casing bottom
        the casing top having a first set of mechanical threads;
        a first over mold stretched over at least part of the exterior of the casing bottom;
        a first battery;
        a transmitter electrically connected to the first battery;
        a first assembly wireless coil;
        a power port;
        the power port located along the first over mold and the casing bottom;
        a first button located on the first over mold and the casing bottom;
        the first button electronically connected to the transmitter;
    a bottle having a second set of mechanical threads, the second set of mechanical threads threadedly connected to the first set of mechanical threads;
    a second assembly in wireless communication with the first assembly and removably placed inside of the bottle, the second assembly having:
        a first shell;
        a second shell mechanically connected to the first shell;
        a second assembly wireless coil;
        a receiver electrically connected to the second assembly wireless coil a second battery electrically connected to the receiver;
        a motor electrically connected to the second battery;
        a propeller mechanically connected to the motor;
        a spiral mechanically connected to the second shell second shell, the spiral at least partially surrounding the propeller;
        a second over mold stretched over at least part of the exterior of the first shell;
        a battery holder mechanically connected to the second battery; and
        a second button located on the second over mold.

* * * * *

UNITED STATES PATENT AND TRADEMARK OFFICE
CERTIFICATE OF CORRECTION

PATENT NO. : 10,258,199 B2
APPLICATION NO. : 15/635339
DATED : April 16, 2019
INVENTOR(S) : Victor Anthony Almaraz, II and Alex Villareal Page 1 of 1

It is certified that error appears in the above-identified patent and that said Letters Patent is hereby corrected as shown below:

On the Title Page

Item (73), should read:
-- Assignee: Victor Anthony Almaraz, II --

Signed and Sealed this
Fourth Day of June, 2019

Andrei Iancu
*Director of the United States Patent and Trademark Office*